UNITED STATES PATENT OFFICE.

HERMANN WAGNER AND JOSEF ERBER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MONOAZO DYESTUFF AND PROCESS OF MAKING SAME.

1,016,307.  Specification of Letters Patent.  Patented Feb. 6, 1912.

No Drawing.  Application filed June 1, 1911. Serial No. 630,580.

*To all whom it may concern:*

Be it known that we, HERMANN WAGNER, Ph. D., chemist, and JOSEF ERBER, Ph. D., chemist, citizens of the Empire of Germany, residing at Höchst-on-the-Main, Germany, have invented certain new and useful Improvements in Monoazo Dyestuffs and Processes of Making Same, of which the following is a specification.

We have found that by combining the diazo compound from 1-naphthylamin-2-sulfonic acid with 2-naphthol-3-carboxylic acid, a dyestuff is obtained, of which the magnesium-, manganese-, strontium-, and barium-salts, and particularly the calcium-salt, are remarkable for their beautiful violet tint and are also of excellent fastness.

The manufacture of the new dyestuff and the new color lakes respectively may be conducted, for instance, as follows: The diazo compound produced in the usual manner from 245 kilos of sodium 1:2-naphthylamin-sulfonate is run into an aqueous solution obtained from 190 kilos of 2-naphthol-3-carboxylic acid dissolved in 380 kilos of caustic soda-lye of 40° Baumé specific gravity and containing 60 kilos of anhydrous sodium carbonate. The reaction occurs quickly.

The new dyestuff forms a dark-red powder, insoluble in alcohol. Its aqueous solution is of a red color and its solution in concentrated sulfuric acid of a violet-blue color; the free acid of the dyestuff separates from the latter solution on addition of water in the form of a blue precipitate.

The further operation for preparing the color-lakes may, for instance, be as follows: 600 kilos of a paste of 20 per cent. strength of the new dyestuff are well stirred with water while adding Turkey-red oil, and into this mass there is run an aqueous solution of the required quantity of the salt which is to form the color-lake, for instance about 80 kilos of calcium chlorid. The mass is then heated until the reaction is terminated. Of course, the formation of the dyestuff and its transformation into the lake can be effected by a single operation.

Having now described our invention, what we claim is:

1. The herein described process of manufacturing a monoazo dyestuff especially suitable for preparing violet color-lakes, which consists in combining 1-diazonaphthalene-2-sulfonic acid with 2-naphthol-3-carboxylic acid.

2. As a new product, the dyestuff obtained by combining 1-diazonaphthalene-2-sulfonic acid with 2-naphthol-3-carboxylic acid, being a dark-red powder insoluble in alcohol, the aqueous solution of which is of a red color and its solution in concentrated sulfuric acid of a violet-blue color, the free acid of the dyestuff separating from the latter solution on addition of water in the form of a blue precipitate.

In testimony whereof, we affix our signatures in presence of two witnesses.

HERMANN WAGNER.
JOSEF ERBER.

Witnesses:
  JEAN GRUND,
  CARL GRUND.